United States Patent [19]
Ohishi

[11] Patent Number: 5,688,179
[45] Date of Patent: Nov. 18, 1997

[54] APPARATUS FOR SIMULATIVELY MOVING A PLAYING BOX OF A SIMULATION GAME MACHINE

[75] Inventor: Toshimitsu Ohishi, Kobe, Japan

[73] Assignee: Konami Co., Ltd., Hyogo-ken, Japan

[21] Appl. No.: 514,635

[22] Filed: Aug. 14, 1995

[30] Foreign Application Priority Data

Aug. 17, 1994 [JP] Japan ................................. 6-193222

[51] Int. Cl.$^6$ ................................................. A63G 31/16
[52] U.S. Cl. ........................... 472/59; 472/130; 434/55
[58] Field of Search ............................... 472/59, 60, 130; 434/55, 58, 29

[56] References Cited

U.S. PATENT DOCUMENTS

| | | |
|---|---|---|
| 2,524,238 | 10/1950 | Soulé. |
| 4,478,407 | 10/1984 | Manabe .................. 434/58 X |
| 4,584,896 | 4/1986 | Letovsky ................ 434/55 X |
| 5,022,708 | 6/1991 | Nordella et al.. |

FOREIGN PATENT DOCUMENTS

| | | |
|---|---|---|
| 0605021 | 7/1994 | European Pat. Off.. |
| 2687491 | 8/1993 | France. |
| 9304395 | 7/1993 | Germany. |
| 61-29785 | 2/1986 | Japan. |
| 06210066 | 8/1994 | Japan. |
| 6210066 | 8/1994 | Japan. |

OTHER PUBLICATIONS

* English abstract is attached.

Patent Abstracts of Japan, vol. 013, No. 585 (C–669), 22 Dec. 1989 & JP–A–01 244782 (Taito Corp), 29 Sep. 1989.

Patent Abstracts of Japan, vol. 018, No. 571 (C–1267), 2 Nov. 1994 & JP–A–06 210066 (Konami KK), 2 Aug. 1994.

*Primary Examiner*—Kien T. Nguyen
*Attorney, Agent, or Firm*—Jordan and Hamburg

[57] ABSTRACT

A simulative moving apparatus for simulatively moving a playing box of a simulation game machine includes: a supporting frame slidable in a vertical direction and having a connection portion swingably connected to a center portion of a horizontal plane member of the playing box: a plurality of elevating cylinders for moving up and down the playing box, each elevating cylinder having a main body and a piston rod, a free end of the piston rod being swingably connected to an end portion of the horizontal plane member of the playing box: and a cylinder support mechanism including: a first support member having a first pivotal axis perpendicularly intersecting an axis of the elevating cylinder for supporting the elevating cylinder in such a manner that the elevating cylinder is swingable about the first pivotal axis: and a second support member having a second pivotal axis perpendicularly intersecting an axis of the first support member in such a manner that the first support member is swingable about the second pivotal axis.

10 Claims, 11 Drawing Sheets

APPARATUS FOR SIMULATIVELY MOVING A PLAYING BOX OF A SIMULATION GAME MACHINE

BACKGROUND OF THE INVENTION

This invention relates to an apparatus for simulatively moving a playing box of a simulation game machine.

In conventional simulation game machines in which a player plays a simulation game on a screen provided in a playing box, there is provided an arrangement for giving a realistic feeling to the player by moving up and down or swaying the playing box in response to his or her operations. This type of simulation same machine has an elevating cylinder at one side and a pivot member at the other side. The elevating cylinder moves the playing box at its one side in a vertical direction to give a rough simulated motion to the player. In the simulation game machine, the elevating cylinder is controlledly driven to raise and lower the playing box in accordance with a simulation image displayed on the screen. The moving apparatus of the prior art, however, can produce a limited simulated motion because the elevating cylinder is provided only at one side of the playing box of the simulation game machine.

To cope with this problem, Japanese Unexamined Patent Publication No. 6-210066 discloses an improved apparatus in which a playing box is supported by three cylinders located at the apices of an equilateral triangle, and the individual cylinders are controlledly driven for moving the playing box in various directions and at different angles. According to the disclosure, an upper end of each cylinder is connected to the playing box by a universal joint and a lower portion of the cylinder is connected to a base member of the apparatus by means of an universal joint. Each universal joint includes a link ball. Also, there is provided a slidable support member to support a weight center of the playing box. The slidable support member is slidably supported on a stand mounted on the base member. The playing box is moved up and down by the cylinders. When the playing box is inclined at an angle, the individual cylinders are tilted about their respective link balls.

Provided with the three cylinders swingably supported by the universal joints at their upper and lower ends as described above, this apparatus is advantageous in that the cylinders can be tilted in any direction according to inclination of the playing box. However, the universal joints are limited in aspect of the supportable angle, and due to this limitation it is impossible to create sufficient reality or simulated motion. Also, a large space is necessary to provide the cylinders between the playing box and the base member. This increases the supporting height of the playing box, making it difficult to achieve the stable supporting condition.

SUMMARY OF THE INVENTION

It is an object of the present invention to provide a simulative moving apparatus for simulatively moving a playing box of a simulation game machine which has overcome the aforementioned problems of the prior art.

It is another object of the present invention to provide a simulative moving apparatus for simulatively moving a playing box of a simulation game machine which can incline the playing box at a greater angle to ensure enhanced variations in simulative motion while supporting the playing box stably.

Accordingly, a simulative moving apparatus of the present invention comprising: a supporting frame slidable in a vertical direction and having a connection portion swingably connected to a center portion of a horizontal plane member of a playing box of a simulation game machine; a plurality of elevating cylinders for moving up and down the playing box, each elevating cylinder having a main body and a piston rod, a free end of the piston rod being swingably connected to an end portion of the horizontal plane member of the playing box; and a cylinder support mechanism including: a first support member having a first pivotal axis perpendicularly intersecting an axis of the elevating cylinder for supporting the elevating cylinder in such a manner that the elevating cylinder is swingable about the first pivotal axis; and a second support member having a second pivotal axis perpendicularly intersecting an axis of the first support member and the axis of the elevating cylinder in such a manner that the first support member is swingable about the second pivotal axis.

The horizontal plane member of the playing box may be a bottom plate provided in the playing box. It may be appreciated to use a universal joint to swingably connect the connection portion of the slidable supporting frame and the piston rod of the elevating cylinder with the horizontal plane member of the playing box. Also, it may be appreciated to arrange three elevating cylinders at the apices of an equilateral triangle.

Further, there may be preferably provided a reinforcing member attached on a base member to reinforce the base member, and having a closed space for containing compressed air; and an air supplier which supplies compressed air from the closed space of the reinforcing member to the plurality of elevating cylinders.

Moreover, each of the plurality of elevating cylinders may be provided with a sensor for measuring the moving-out amount of the piston rod.

Furthermore, it may be preferable to provide a guide member between adjacent two elevating cylinders to guide a vertical movement of the slidable support frame.

At least one of the first and second pivotal axes may pass through the elevating cylinder.

With these apparatus, each elevating cylinder is swingably supported by the support mechanism including the first and second support members. The first support member has the first pivotal axis perpendicularly intersecting an axis of the elevating cylinder. The second support member has the second pivotal axis perpendicularly intersecting an axis of the first support member. This will make it possible to narrow the gap between a mounting level of the elevating cylinders and the playing box of the simulation game machine, and then reduce a moment acting on the supporting frame. Accordingly, the playing box can be supported in a stabler manner compared to the conventional apparatus in which the upper and lower ends of each elevating cylinder are connected to the playing box and the base plate by means of universal joints, respectively.

Also, the main cylinder bodies can be inclined in any directions and the tilt angle can be set to a large value. Accordingly, the playing box can be rocked or swayed at a great variety of motions, which consequently gives an enhanced feeling of reality to individual players.

The closed space of the reinforcing member is used as an air tank. The reinforcing member not only increases the stiffness of the apparatus but also eliminates the need of provision of a special air tank for the air cylinders. This will ensure a reduced installation space.

Each elevating cylinder is provided with a sensor for measuring the moving-out amount of the piston rod. When the elevating cylinder is inclined following an inclination of the playing box, the sensor provided on the elevating cylinder is also inclined. This will prevent angular deviation between the sensor and the piston rod, and ensure accurate measurement of the moving-out amount of the piston rod at any time.

The slidable supporting frame is guided by the guide member provided between adjacent elevating cylinders. Accordingly, the vertical movement of the supporting frame can be properly guided without increasing the apparatus size.

These and other objects, features and advantages of the invention will become more apparent upon a reading of the following detailed description of the preferred embodiment with reference to the appended drawings.

DETAILED DESCRIPTION OF THE PREFERRED EMBODIMENT OF THE INVENTION

Figure 1:
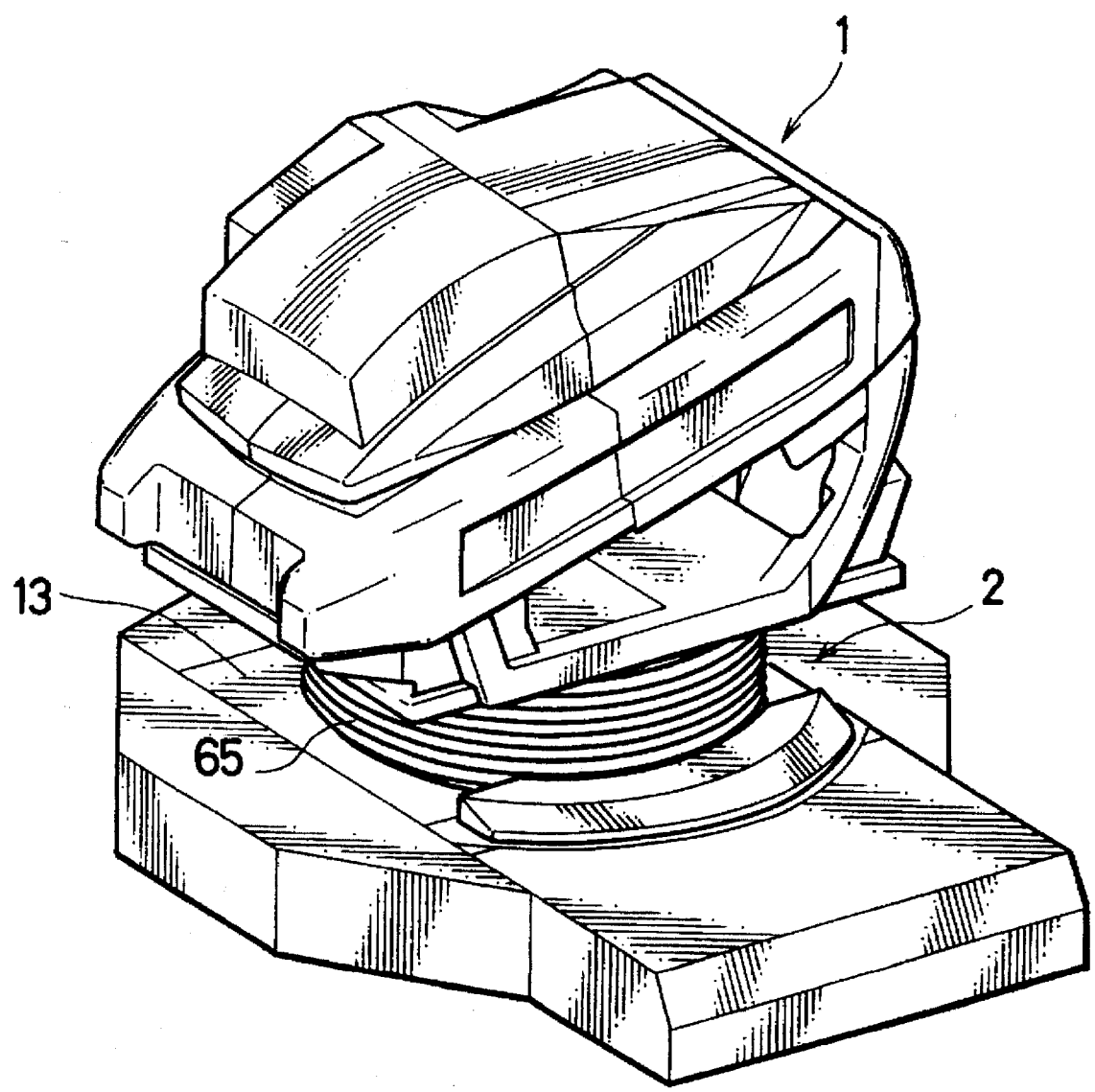
FIG. 1 is a perspective view showing an overall external appearance of a simulation game machine using a simulative moving apparatus of the present invention.
Figure 2:
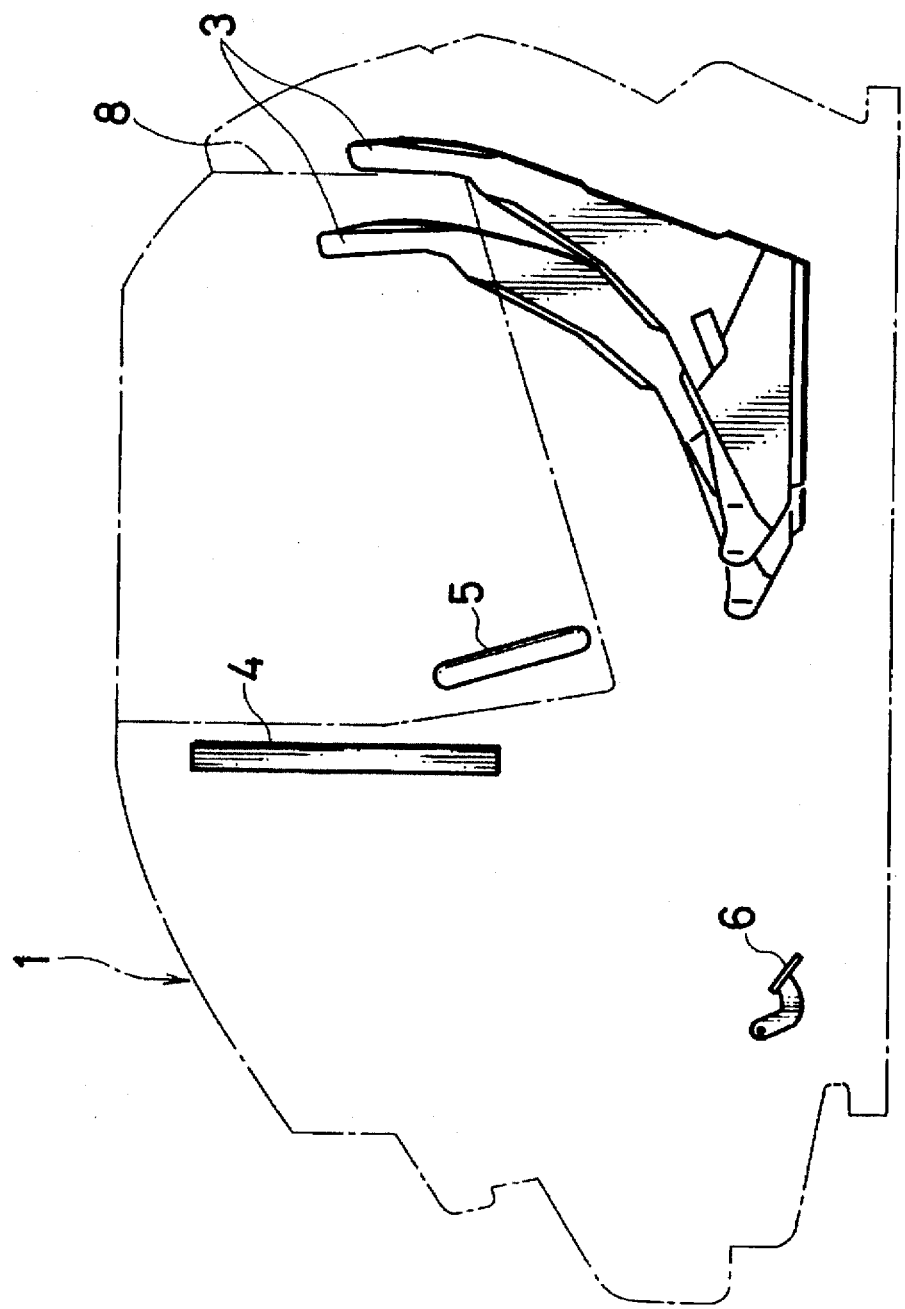
FIG. 2 a schematic diagram showing a side of a playing box of the simulation game machine.
Figure 3:
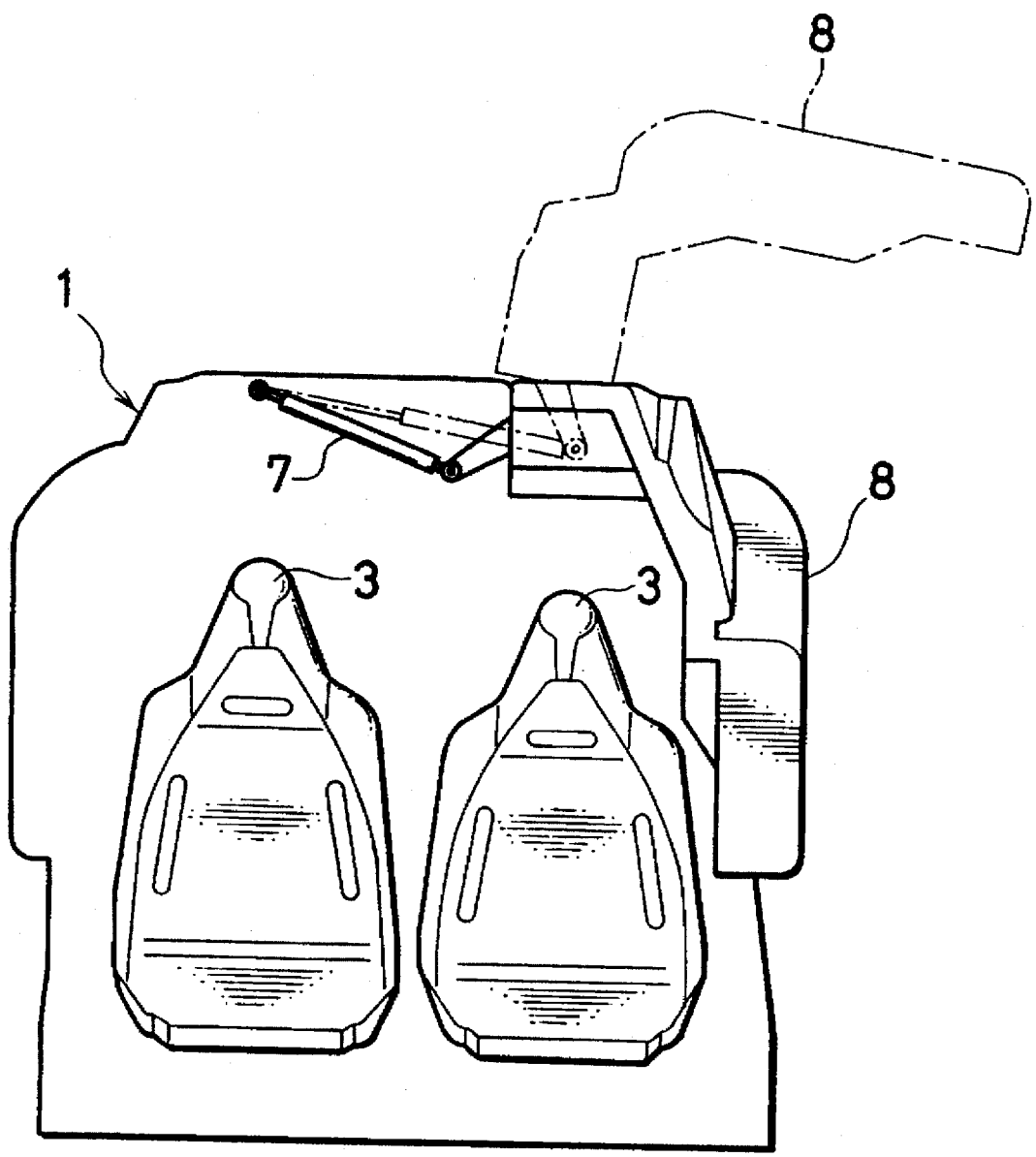
FIG. 3 is a schematic diagram showing a front of the playing box.

FIG. 1 shows a simulation game machine using a simulative moving apparatus of the present invention. The simulation game machine comprises a playing box 1 which can accommodate one or two players when playing a simulation same, and a drive section 2 for turning and moving up and down the playing box 1. The playing box 1 of the simulation game machine is, as shown in FIGS. 2 and 3, provided with a pair of seats 3 allowing two players to be seated side by side, a simulation game screen 4 employing a cathode ray tube (CRT), a liquid crystal display (LCD) or the like, a steering wheel 5 operated by the players, pedals 6 such as an accelerator pedal and a brake pedal, and gull-wing doors 8 to be swung upward by means of a cylinder 7.

Figure 4:
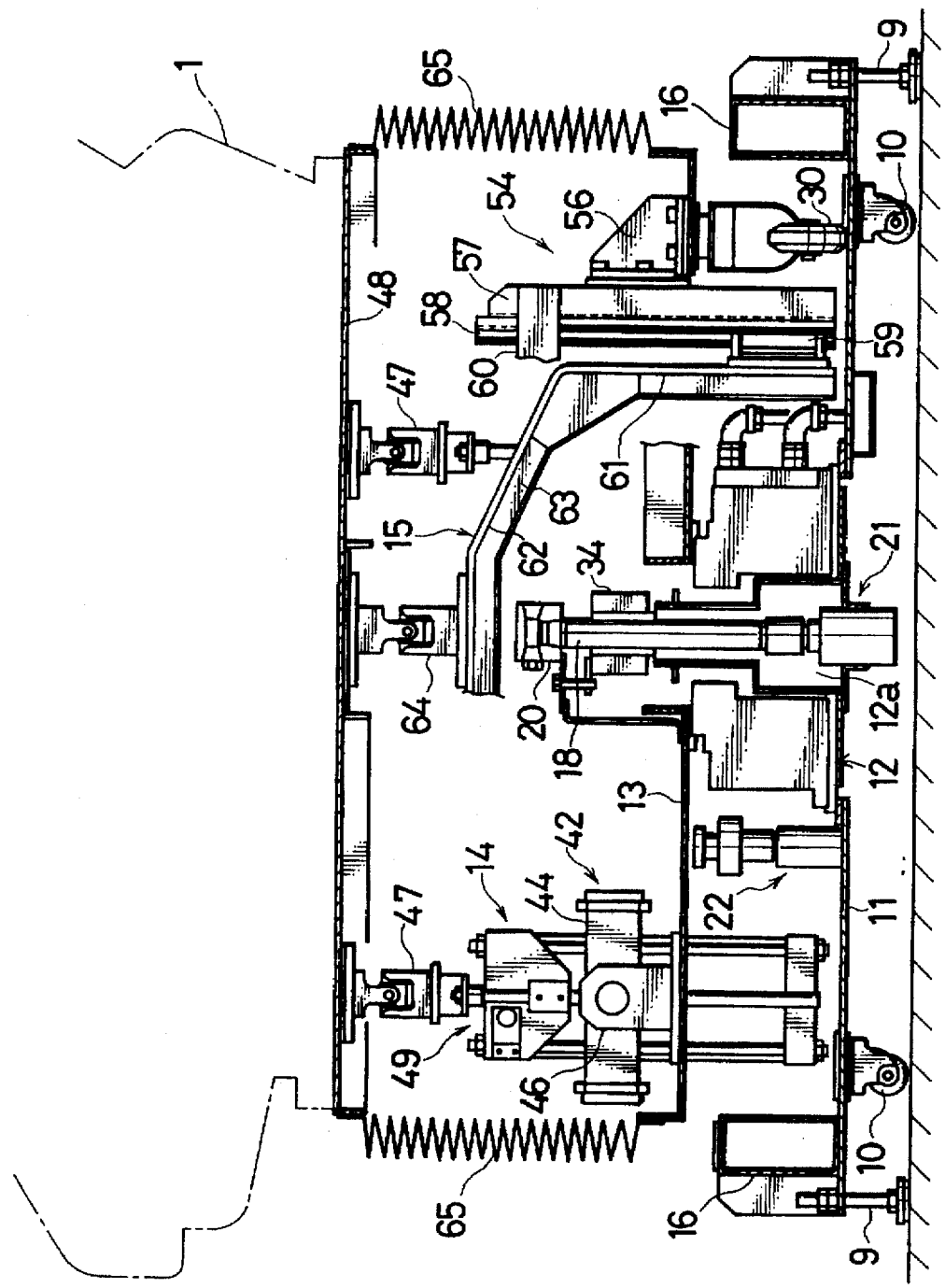
FIG. 4 is a sectional view showing a drive section of the simulation game machine.
Figure 5:
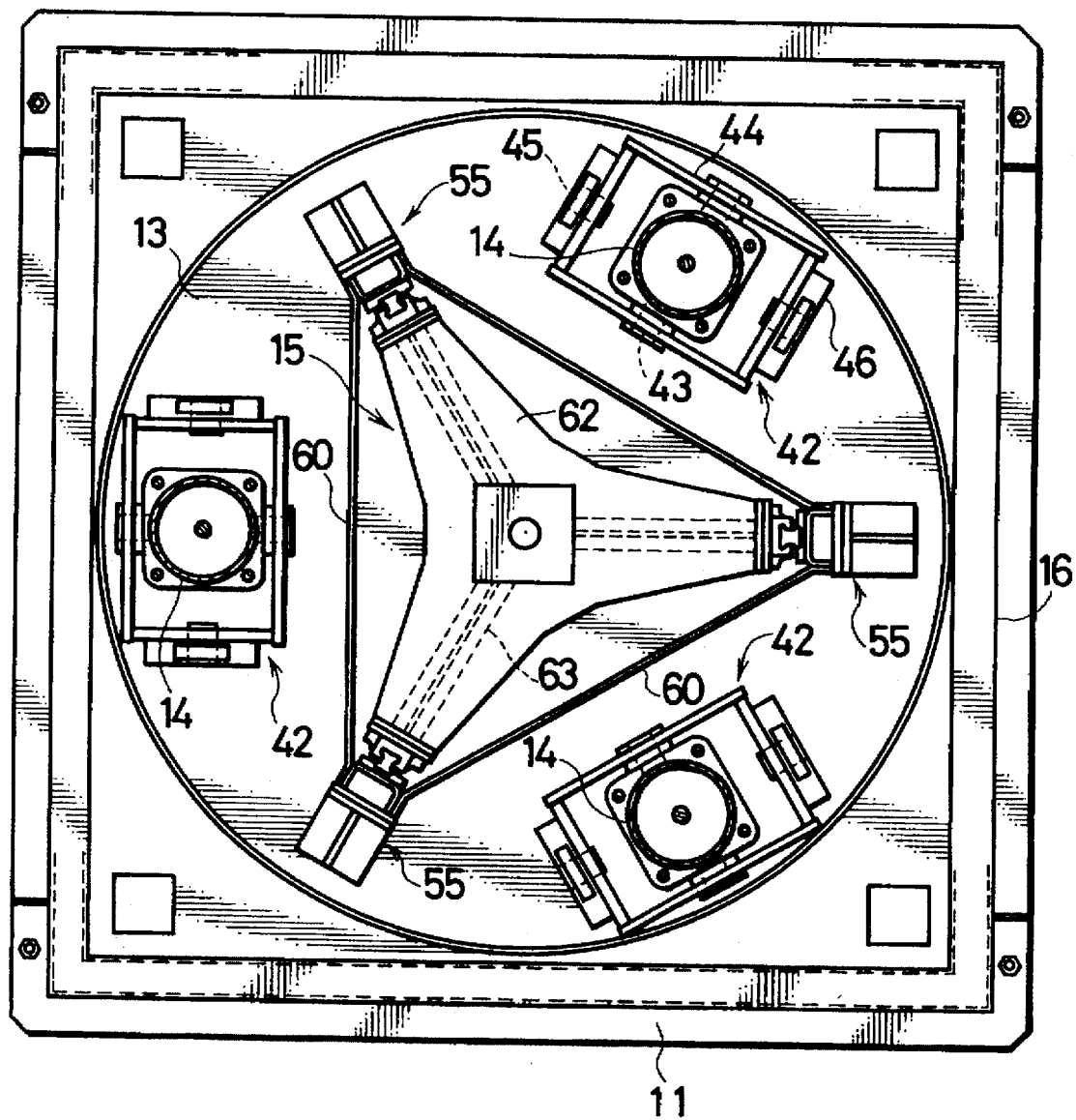
FIG. 5 is a plan view showing the drive section.

As shown in FIGS. 4 and 5, the drive section 2 includes a base plate 11 attached with adjusters 9 and casters 10, a torque motor 12 mounted at an approximate center of a top surface of the base plate 11, a circular turn table 13 which is rotated around by the torque motor 12, and three elevating cylinders 14 radially arranged on the turn table 13 around its center of rotation. A slidable supporting frame 15 is provided beneath the playing box 1 of the simulation game machine. A space between the bottom of the playing box 1 and the turn table 13 is surrounded by a bellows-like cover 65.

A square pipe 16 is attached on a periphery end of a top surface of the base plate 11 as a reinforcing member for reinforcing the base plate 11. The square pipe 16 has a closed space which is used as an air tank. Pressurized air is filled in the closed space of the reinforcing members by an air compressor as disclosed hereinafter, and is then supplied to the cylinder 7, elevating cylinders Also, provided at a center of the base plate 11 is an air supply unit 21 comprising an air joint 17 connected to the air tank of the reinforcing members 16 via an unillustrated connecting pipe, an air pipe 18 extending upward through an opening 12a formed in a center portion of the torque motor 12, and a swivel joint 20 attached at a center of the top surface of the turn table 13 via a retaining bracket 19.

Figure 6:
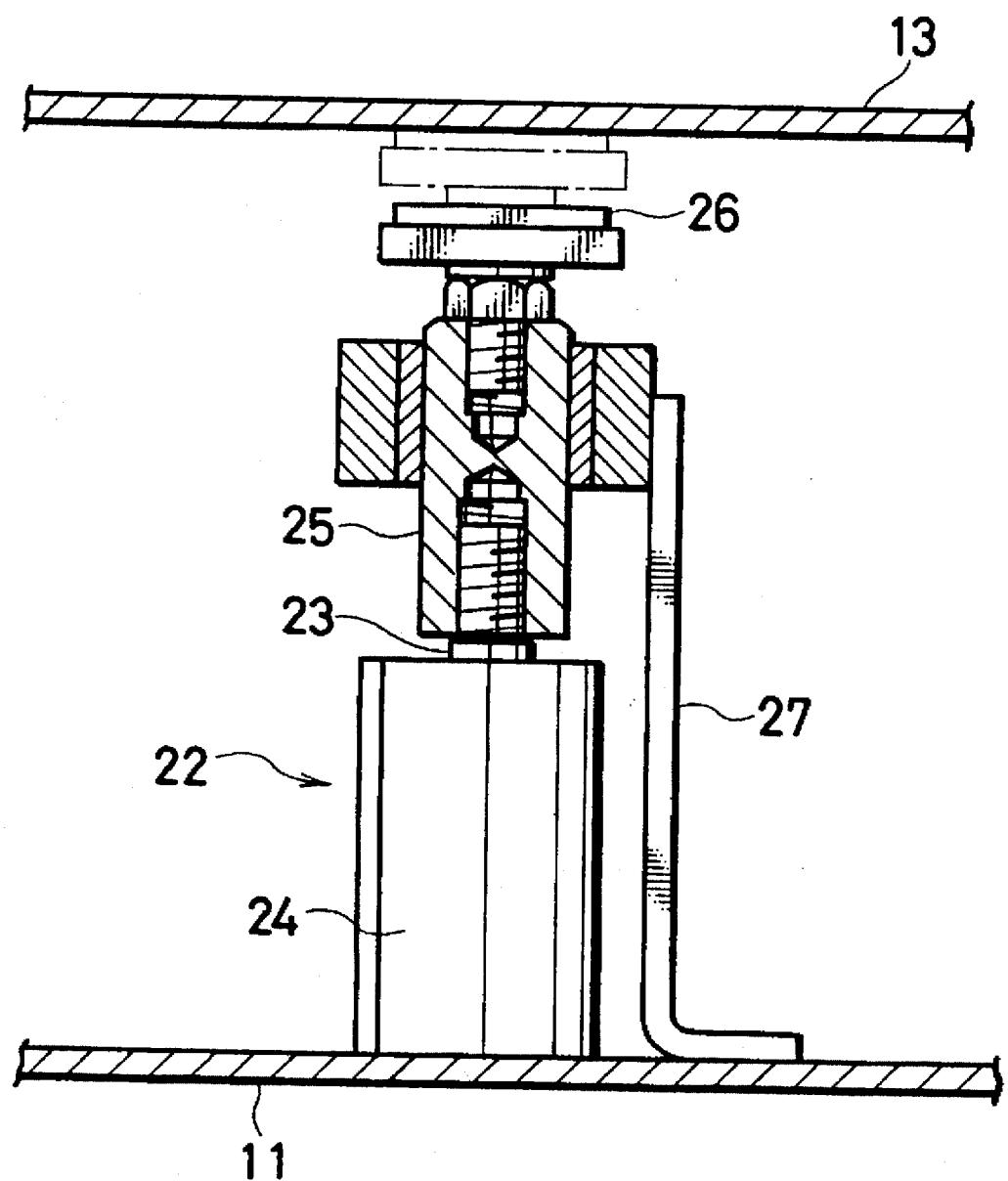
FIG. 6 is a sectional view showing a brake cylinder.

Furthermore, a brake cylinder 22 is mounted on the base plate 11 and outside the torque motor 12 to stop rotation of the turn table 13 whenever necessary. As shown in FIG. 6, the brake cylinder 22 includes a main cylinder body 24 for moving up and down a piston rod 23, a brake pad 26 attached to an upper end of the piston rod 23 by a connecting member 25. Also, a supporting bracket 27 is attached on the base plate 11 to slidably support the connecting member 25. In case of emergency such as a power failure or a breakdown of an electric system of the simulation game machine, compressed air is supplied into the main cylinder body 24 to push up the piston rod 23, causing the brake pad 26 to be tightly pressed against the bottom of the turn table 13.

Figure 7:
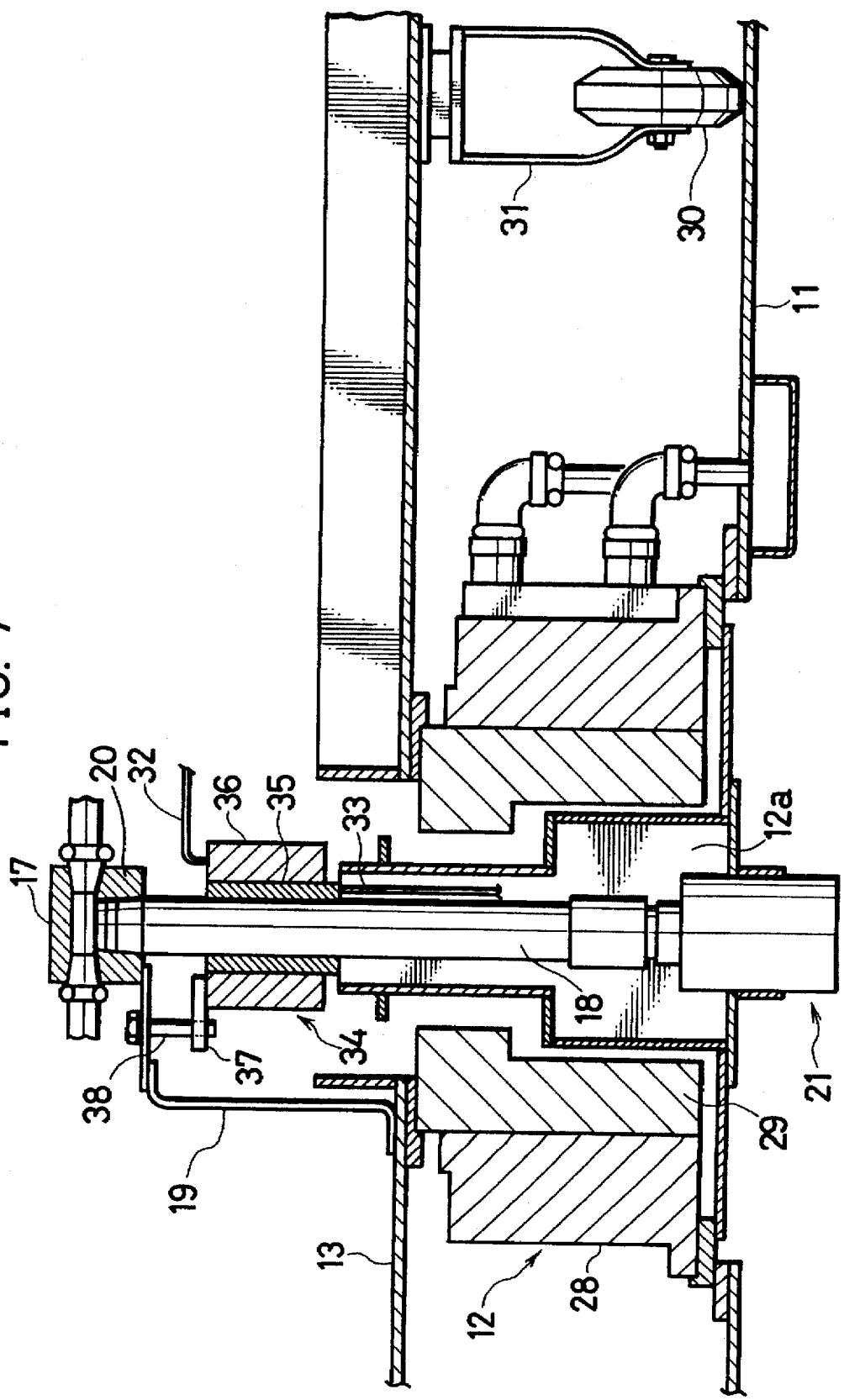
FIG. 7 is a sectional view showing a turn drive mechanism

Referring to FIG. 7, the torque motor 12 includes a stator 28 mounted on the base plate 11 and a rotor 29 having a hollow cylindrical shape which is rotated by the stator 28. The turn table 13 is fixedly attached to the upper end of the rotor 29. A plurality of wheels 30 are attached on a periphery end of an underside of the turn table 13 by retainers 31. As the rotor 29 of the torque motor 12 rotates, the wheels 30 roll over the base plate 11, thereby rotating the turn table 13.

A rotary connector 34 is provided around the air pipe 18 of the air supply unit 21 for connecting between upper and lower lead wires 32, 33 for signal transmission. The rotary connector 34 includes an inner member 35 firmly attached to the air pipe 18 and an outer member 36 rotatably mounted over the inner member 35. As a stopper plate 37 sticking out from the outer member 36 is caught by a protruding bolt 38 fixedly attached to the retaining bracket 19 of the turn table 13, the outer member 36 is rotated together with the turn table 13.

A terminal for the upper lead wires 32 which are connected to the outer member 36 is located on an inner surface of the outer member 36 while a terminal for the lower lead wires 33 which are passed through a gap between the air pipe 18 and the rotor 29 of the torque motor 12 and connected to the inner member 35 is located on an outer surface of the inner member 35. The two terminals are arranged in such a way that they are kept in mutual contact, the upper lead wires 32 and lower lead wires 33 are connected to each other. This arrangement makes it possible to exchange control signals between a controller mounted on the base plate 11, for instance, and control devices mounted on the playing box 1 without causing the lead wires 32, 33 to twist even when the turn table 13 rotates.

Figure 8:
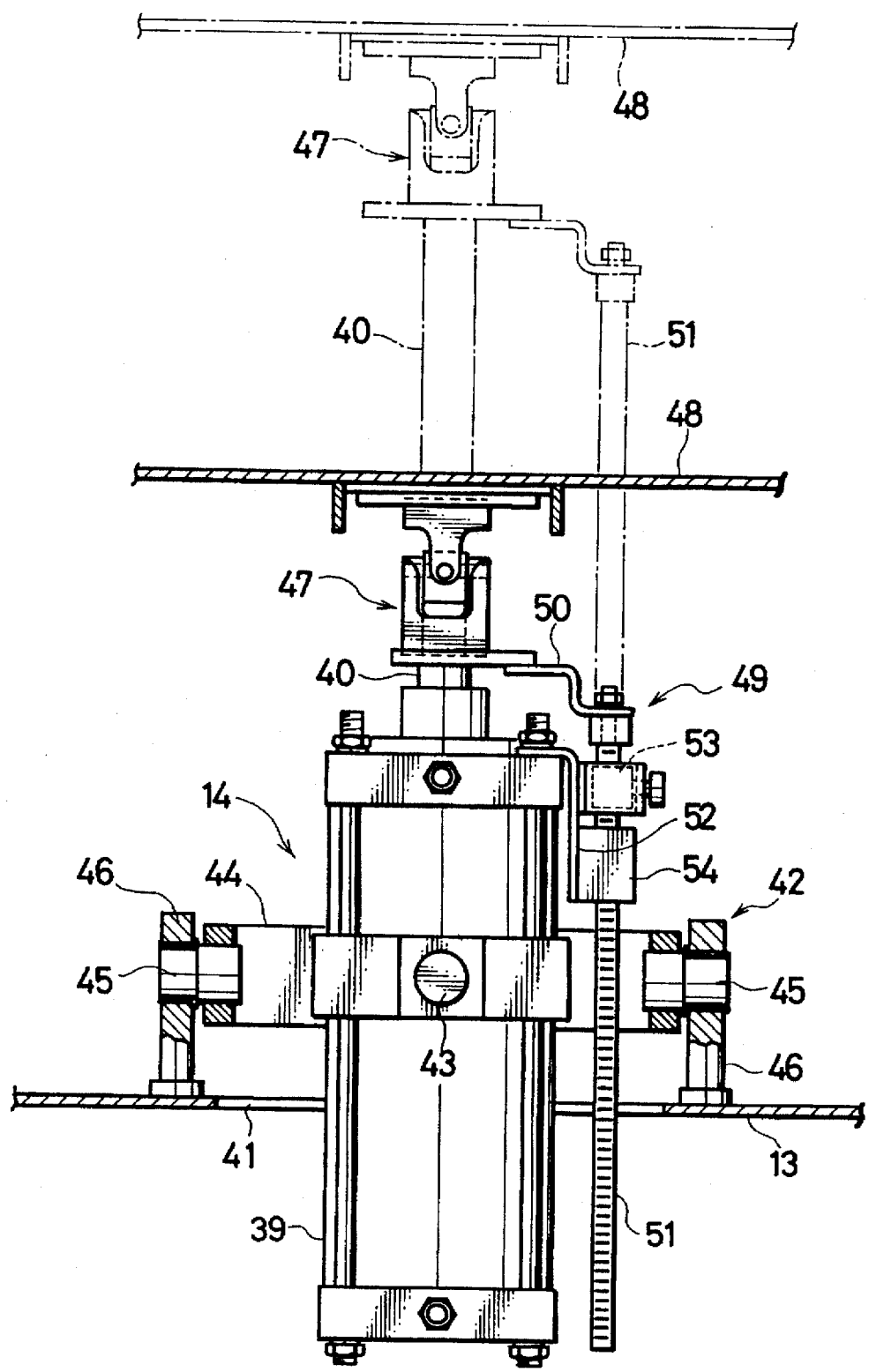
FIG. 8 is a sectional view showing an elevating cylinder.

Referring to FIG. 8, each elevating cylinder 14 includes a main cylinder body 39 having upper and lower air ports, and a piston rod 40 movable out and in the main cylinder body 39. The main cylinder body 39 is swingably supported at an upper position slightly away from a midpoint of its length by a support mechanism 42 mounted on a top surface of the turn table 13 with the lower portion of the main cylinder body 39 sticking out from under the turn table 13 through an opening 41 formed close the periphery.

Each support mechanism 42 includes a first support member 44 formed into a rectangular shape to support the relevant elevating cylinder 14 swingably about a first pair of pivots 43 projectingly mounted on both sides of the main cylinder body 39 along a line passing through the center of rotation of the turn table 13, and a second support member 46 having a pair of supporting brackets to support the first support member 44 swingably about a second pair of pivots 45 projectingly mounted at right angles to the axis of the first pair of pivots 43.

It will be seen that the individual elevating cylinders 14 are supported swingably at a desired angle about the first and second pairs of pivots 43 and 45 mounted at right angles to each other. Also, the piston rod 40 of each elevating cylinder 14 is connected to a bottom plate 48 of the playing box 1 via a universal joint 47 having a pair of mutually perpendicular pivots. Each elevating cylinder 14 is provided with a displacement gauge 49 for measuring the amount of projection of the piston rod 40.

Each displacement gauge 49 includes a rack bar 51 fixedly attached to the upper end of the piston rod 40 by a mounting bracket 50, a potentiometer 53 and a rack guide 54 fixedly attached to the top of the main cylinder body 39 by a mounting bracket 52. When the piston rod 40 is driven and the rack bar 51 is pulled upward, a pinion of the potentiometer 53 rotates. As a result, the potentiometer 53 outputs a signal indicating the amount of projection of the piston rod 40, or the amount of the upward movement of the bottom plate 48 of the playing box 1, to the unillustrated controller.

Referring again to FIGS. 4 and 5, three guiding stands 55 are provided between the elevating cylinders 14 on the turn table 13 to guide the vertical movement of the slidable supporting frame 15. Each guiding stand 55 includes a supporting bracket 56 fixedly attached to the top surface of the turn table 13 near the periphery of the turn table 13, a C-shaped vertical steel member 57 fixedly attached to the supporting bracket 56, a guide rail 58 mounted on the C-shaped vertical steel member 57, and a slide block 59 supported movably along the guide rail 58. The individual C-shaped vertical steel members 57 are tied up together at their upper ends by reinforcing plates 60.

The slidable supporting frame 15 has three legs 61 whose lowermost portions are individually fixedly attached to the slide blocks 59 of the guiding stands 55, upper plates 62 extending inward from the upper ends of the individual legs 61, and reinforcing ribs 63 attached to the underside of the respective upper plates 62. Between the bottom plate 48 of the playing box 1 and a center of a top surface of the slidable supporting frame 15 where the individual upper plates 62 meet, there is provided a universal joint 64 having a pair of mutually perpendicular pivots. This universal joint 64 connects between the center of the slidable supporting frame 15 and a center of the underside of the playing box 1 to allow the playing box 1 to rock or swing in desired directions. As the playing box 1 is pushed upward and pulled downward by the elevating cylinders 14, the slidable supporting frame 15 supports the playing box 1 so that the latter can be slanted while being guided by the guiding stands 55.

Figure 9:
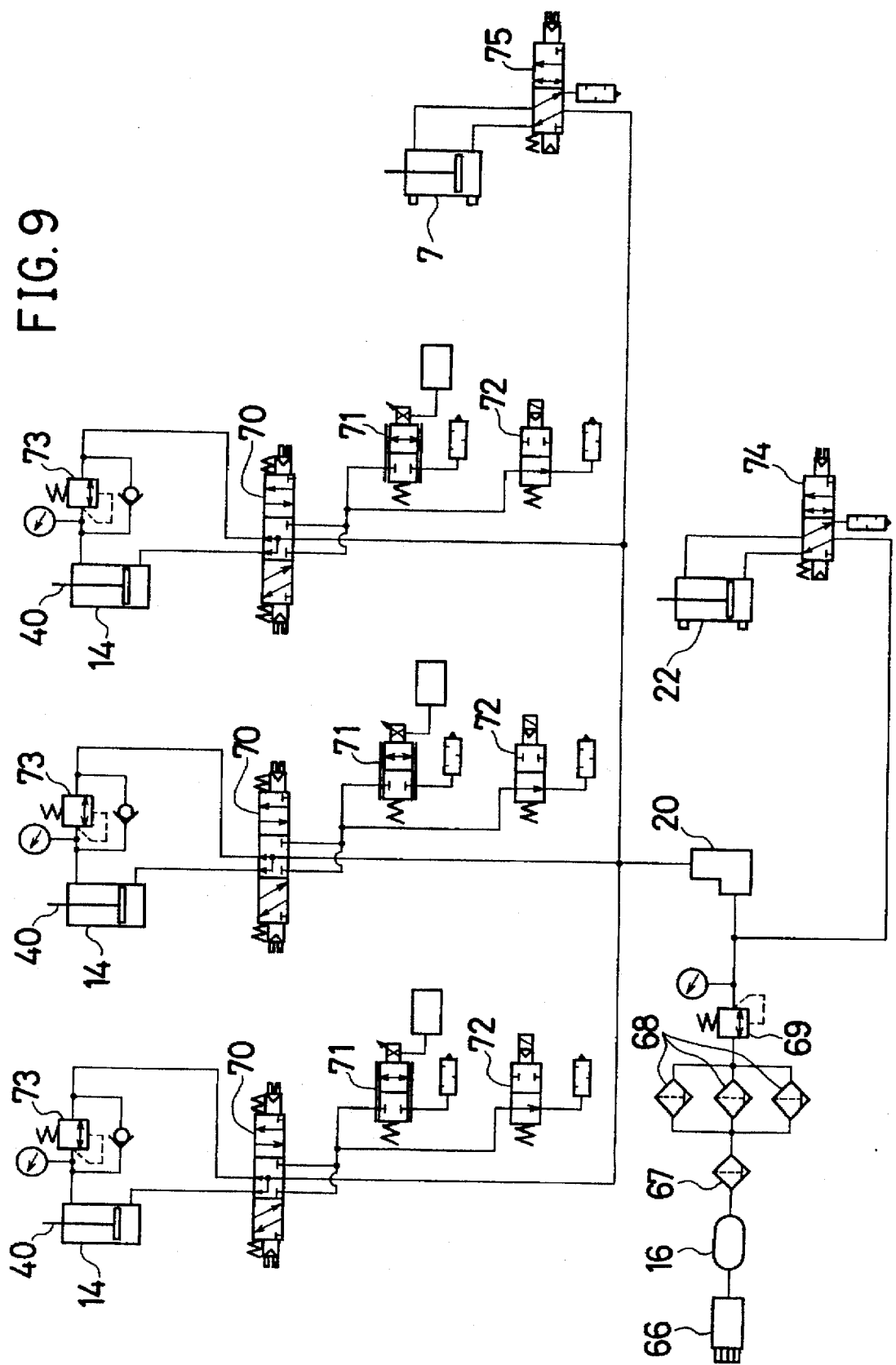
FIG. 9 is a diagram showing a configuration of a pneumatic pressure control circuit.

Referring to FIG. 9, a pneumatic pressure control circuit for supplying compressed air to the individual elevating cylinders 14 includes an air source 66 having the air compressor, the reinforcing members 16 constituting the air tank, air filters 67 and 68, a regulator 69 and the swivel joint 20 of the air supply unit 21. Pressurized air supplied to the turn table 13 by way of the air supply unit 21 is supplied into the individual elevating cylinders 14 via three-way directional control valves 70.

Each three-way directional control valve 70 is associated with a pair of valves 71 and 72. Upward and downward speeds of the piston rod 40 of each elevating cylinder 14 are controlled as the valves 71 and 72 individually open and close in accordance with control signals sent from the unillustrated controller. There is provided a reverse regulator 73 at an upper air supply port of each elevating cylinder 14 in order to equalize upward and downward speeds of the playing box 1.

Part of the air supplied through the regulator 69 is supplied to the brake cylinder 22 via a directional control valve 74 while part of the air supplied to the turn table 13 through the swivel joint 20 is supplied to the cylinder 7 via a directional control valve 75 for opening and closing the gull-wing doors 8 of the playing box 1.

As a player seated in the playing box 1 of the simulation game machine operates the steering wheel 5 or other controls, the torque motor 12 causes the turn table 13 to rotate together with the elevating cylinders 14, slidable supporting frame 15, guiding stands 55 and playing box 1 that are all mounted on the turn table 13. In this way, the player has a realistic feeling consistent with the image shown on the simulation game screen 4.

Specifically, sensor signals indicating operating status of the steering wheel 5, accelerator and brake pedals 6, etc. are entered via the upper lead wires 32, rotary connector 34 and lower lead wires 33 to the unillustrated controller. The controller outputs control signals corresponding to the sensor signals to the torque motor 12. Consequently, the turn table 13 and the playing box 1 are rotated together in a direction and at a speed in accordance with the operating direction and speed of the steering wheel 5 and other controls.

Figure 10:
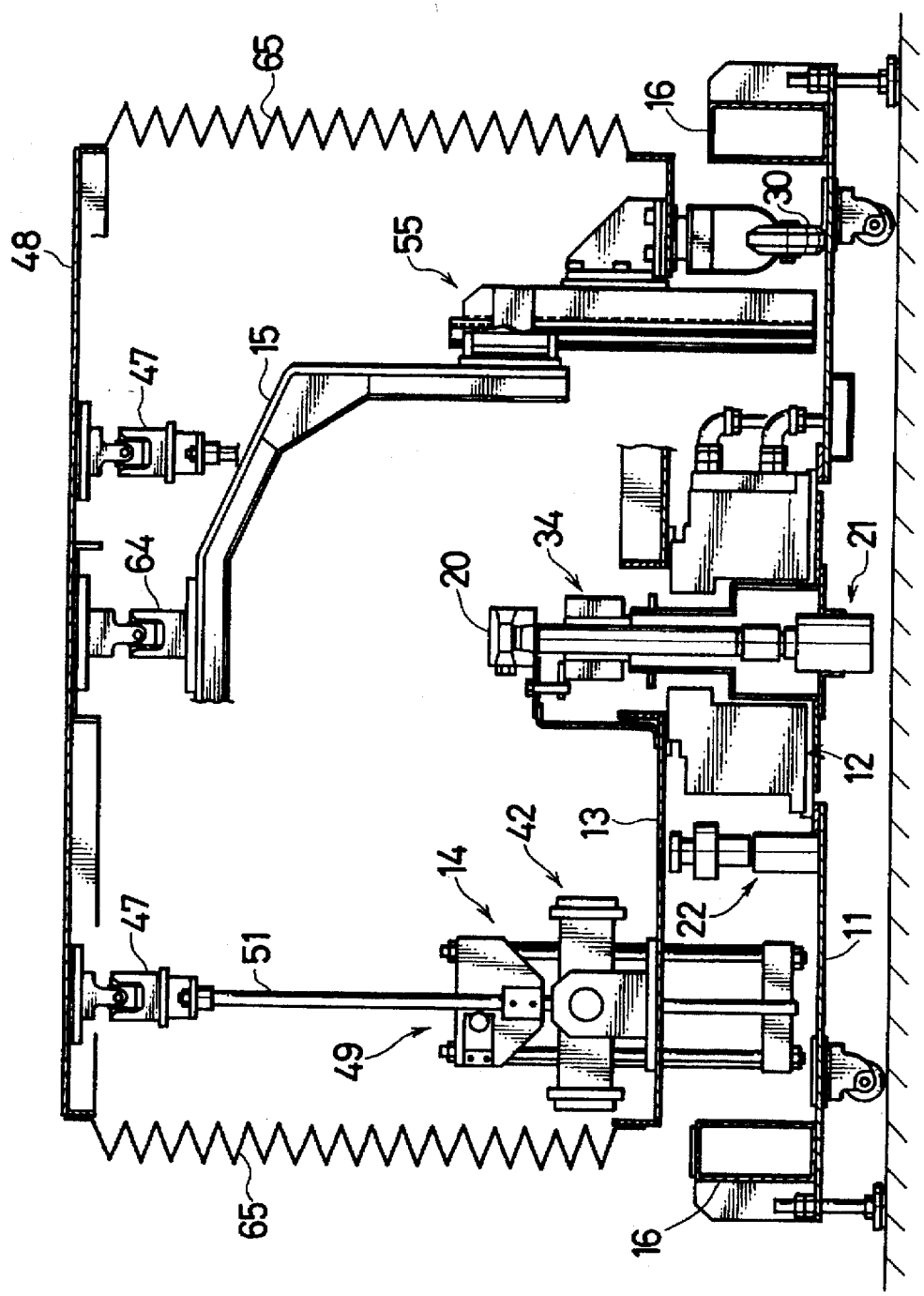
FIG. 10 is a sectional view similar to FIG. 4, showing a state in which the playing box is raised in a horizontal posture.
Figure 11:
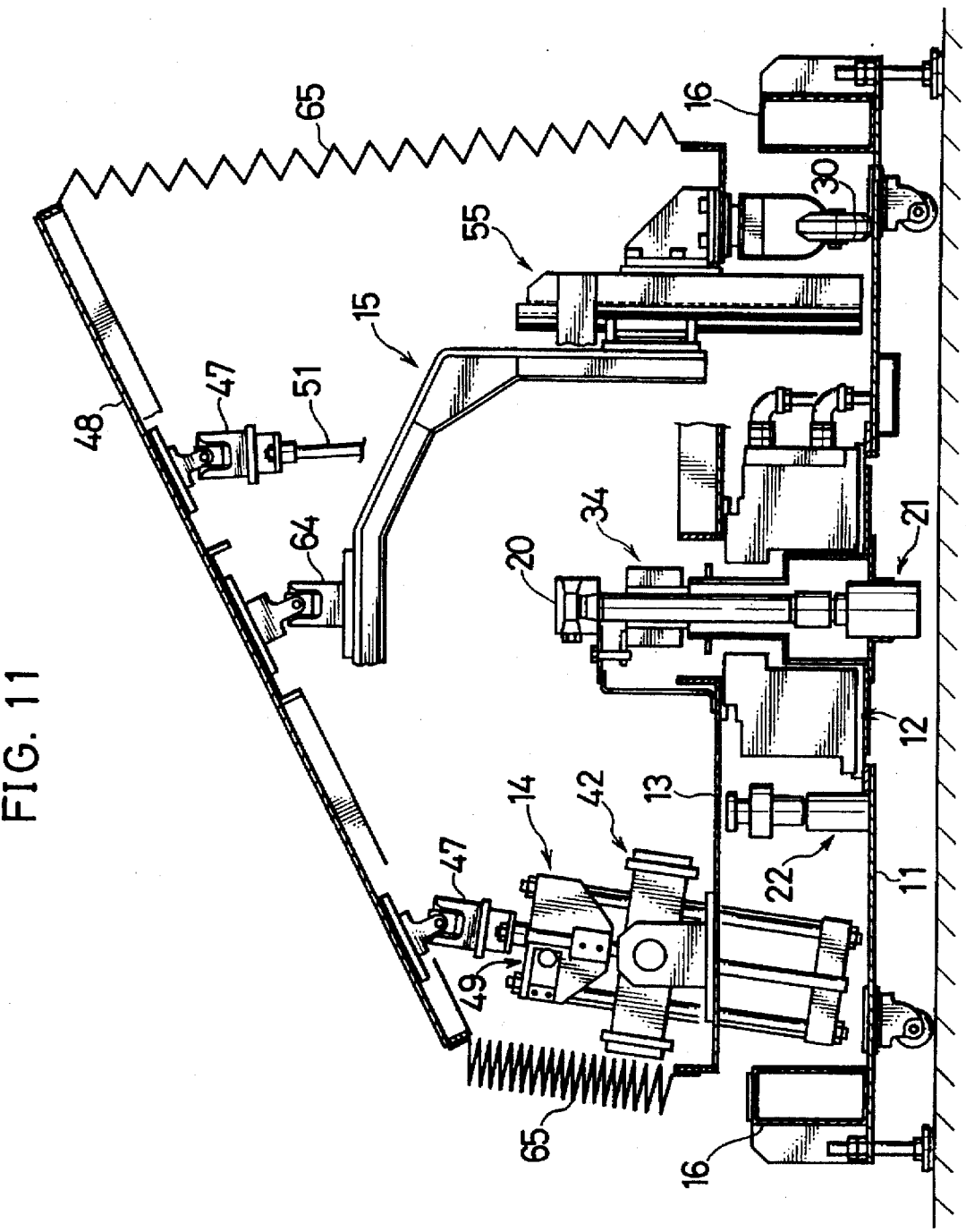
FIG. 11 is a sectional view similar to FIG. 4, showing a state in which the playing box is raised in a slanted posture.

When air charged from the air source 66 into the air tank of the reinforcing members 16 is delivered to the individual elevating cylinders 14 via the air supply unit 21 and other fittings, the bottom plate 48 of the playing box 1 is driven up and down. If the piston rods 40 of all the elevating cylinders 14 evenly moved out, for example, the bottom plate 48 of the playing box 1 rises in a horizontal posture as shown in FIG. 10. If the piston rods 40 of the elevating cylinders 14 unevenly moved out, the bottom plate 48 of the playing box 1 is inclined as shown in FIG. 11

When the playing box 1 is inclined, horizontal distances between the upper ends of the individual piston rods 40 become smaller. The upper ends of the piston rods 40 are pulled inward. Therefore, this causes the individual elevating cylinders 14 to sway inward about the first and second pairs of pivots 43 and 45. As a result, the playing box 1 of the simulation game machine can be maintained aslant without causing deformation of the piston rods 40 of the elevating cylinders 14.

When the playing box 1 moves up or down, the slidable supporting frame 15 connected to the center of the bottom plate 48 of the playing box 1 is also carried up or down, guided by the guiding stands 55. Thanks to this construction, it is possible to prevent the individual elevating cylinders 14 from turning over even when the playing box 1 is inclined and its supporting forces are not properly balanced. Thus, the playing box 1 can be raised and lowered in a safe and stable manner.

As seen above, the main cylinder body 39 of each elevating cylinder 14 is swingably supported by its support mechanism 42 mounted on the turn table 13 and the piston rod 40 of each elevating cylinder 14 is connected to the bottom plate 48 of the playing box 1 by the universal joint 47. With this arrangement, the playing box 1 can be moved up and down and inclined to desired angles without requiring much space between the playing box 1 and the mounting level of the elevating cylinders 14.

More particularly, each main cylinder body 39 is vertically supported at approximately the midpoint of its length by means of the support mechanism 42. Accordingly, each main cylinder body 39 is mounted with its lower portion positioned below the turn table 13 sticking out downward through the opening 41. This arrangement serves to narrow the gap between the mounting level of the elevating cylinders 14, or the turn table 13 on which the support mechanisms 42 are mounted, and the bottom plate 48 of the playing box 1 which is raised and lowered by the piston rods 40 of the elevating cylinders 14. In addition, the arrangement reduces moments acting on the slidable supporting frame 15 and guiding stands 55 which support the playing box 1 when it is raised or lowered. It will be seen that the simulative moving apparatus of the invention can support the playing box 1 in a stabler manner compared to the conventional apparatus in which each elevating cylinder is supported with its lower end mounted on a turn table by means of a universal joint.

Furthermore, the main cylinder bodies 39 can be inclined in a desired direction and yet the tilt angle can be set to a large value. This is because each support mechanism 42 includes the first and second pairs of pivots 43, 45 and the individual main cylinder bodies 39 are supported swingably about them. It is therefore possible to produce a great variety of rocking or swinging motions of the playing box 1 and consequently give an enhanced feeling of reality to individual players.

In the foregoing embodiment, both the first pivot pair 43 and the second pivot pair 45 are disposed so as to pass the position near the midpoint of the elevating cylinder 14. However, it could be appreciated to dispose one of the first pivot pair 43 and the second pivot pair 45 so as to pass a position at or below a bottom end of the elevating cylinder 14 and dispose the other so as to pass an intermediate position of the elevating cylinder 14.

In the foregoing embodiment, there are provided the reinforcing members 16 having the closed space which is used as an air tank along the periphery of the base plate 11 on which the playing box 1 and the turn table 13 are mounted. The reinforcing members 16 effectively increase the stiffness of the base plate 11 and yet serve to reduce the reduce the size of the apparatus by eliminating the need for a dedicated space for installing the air tank.

Each elevating cylinder 14 is individually provided with the rack bar 51 mounted to the piston rod 40 as well as the displacement gauge 49 including the potentiometer 53 attached to the main cylinder body 39 for measuring the amount of projection of the piston rod 40. With this arrangement, when the elevating cylinder 14 is inclined as a result of inclination of the playing box 1, the displacement gauge 49 also becomes aslant together with the elevating cylinder 14. This construction helps prevent angular deviation between the displacement gauge 49 and piston rod 40 so that the displacement gauge 49 can correctly measure the amount of projection of the piston rod 40 at any time, making it possible to properly control the operation of the apparatus in accordance with measured values.

The slidable supporting frame 15 is supported at its outermost positions by the guiding stands 55, each mounted between two adjacent elevating cylinders 14. This arrangement not only makes it possible to effectively support the slidable supporting frame 15, ensuring proper distribution of the load imposed on it when raising or lowering the playing box 1, but prevents the system from becoming too large by allowing effective use of the available space with the individual guiding stands 55 mounted between the adjacent elevating cylinders 14.

In this embodiment, there is provided the torque motor 12 for rotating the turn table 13 on which the elevating cylinders 14 are mounted. The turn table 13 and the playing box 1 are rotated together by the torque motor 12 in response to player operations on the steering wheel 5. This will further increase the player's feeling of reality.

As described above, various components including the air supply unit 21 for supplying compressed air and the lead wires 32 and 33 for transmitting control signals are provided within the opening 12a at the center of the torque motor 12. This configuration ensures trouble-free supply of compressed air and exchange of control signals to and from individual components of the turn table 13 without making the pneumatic tubing and electric wiring too complex.

In this embodiment, there is provided the rotary connector 34 including the inner member 35 mounted on the air pipe 18 of the air supply unit 21 and the outer member 36 which hooks on the turn table 13 for connecting between the upper lead wires 32 connected to various components on the turn table 13 and the lower lead wires 33 routed downward from the turn table 13. Since the rotary connector 34 prevents the upper and lower lead wires 32, 33 from being twisted when the turn table 13 rotates, the control signals are correctly transmitted.

Further, the brake cylinder 22 is mounted on the base plate 11 of the simulation game machine. In case of power failure or system breakdown, the brake cylinder 22 causes the piston rod 23 to move out so that the brake pad 26 at the upper end of the piston rod 23 is securely pressed against the bottom of the turn table 13. Therefore, even when a failure occurs while the turn table 13 is being rotated by the torque motor 12, rotation of the turn table 13 is automatically stopped so that the player would not be frightened.

Although the invention has so far been described with reference to its preferred embodiment having three elevating cylinders 14, it will be understood that there may be provided more than three elevating cylinders 14 with their strokes properly controlled in accordance with control signals outputted from the controller depending on the tilt angle of the playing box 1.

What is claimed is:

1. A simulative moving apparatus for simulatively moving a playing box of a simulation game machine, comprising:

a supporting frame slidable in a vertical direction and having a connection portion adapted to be swingably connected to a center portion of a horizontal plane member of the playing box:

a plurality of elevating cylinders for moving the playing box up and down, each elevating cylinder having a main body and a piston rod, a free end of the piston rod being adapted to be swingably connected to an end portion of the horizontal plane member of the playing box; and a cylinder support mechanism including:

a first support member having a first pivotal axis perpendicularly intersecting an axis of the elevating cylinder, the first support member supporting the elevating cylinder in such a manner that the elevating cylinder is swingable about the first pivotal axis; and a second support member having a second pivotal axis perpendicularly intersecting the first pivotal axis of the first support member and the axis of the elevating cylinder in such a manner that the first support member is swingable about the second pivotal axis.

2. A simulative moving apparatus as defined in claim 1, wherein:

the connection portion of the slidable supporting frame includes a universal joint adapted to be connected with the horizontal plane member of the playing box; and the piston rod of the elevating cylinder includes a universal joint adapted to be connected with the horizontal plane member of the playing box.

3. A simulative moving apparatus as defined in claim 1, wherein three elevating cylinders are arranged at the apices of an equilateral triangle.

4. A simulative moving apparatus as defined in claim 1, wherein each of the plurality of elevating cylinders is an air cylinder, further comprising:

a base member on which the supporting frame, the plurality of elevating cylinders, and the cylinder support mechanism are mounted;

a reinforcing member attached on the base member to reinforce the base member, and having a closed space for containing compressed air; and an air supplier which supplies compressed air from the closed space of the reinforcing member to the plurality of elevating cylinders.

5. A simulative moving apparatus as defined in claim 1, wherein each of the plurality of elevating cylinders is provided with a sensor for measuring the moving-out amount of the piston rod.

6. A simulative moving apparatus as defined in claim 1, further comprising a guide member disposed between adjacent two elevating cylinders for guiding a vertical movement of the slidable support frame.

7. A simulative moving apparatus as defined in claim 1, wherein at least one of the first and second pivotal axes passes through elevating cylinder.

8. A simulative game machine as defined in claim 7, wherein the horizontal plane member of the playing box is a bottom plate provided on the playing box.

9. A simulative game machine comprising:

a playing box having a horizontal plane member, said horizontal plane member having an outer portion and an end portion;

a supporting frame slidable in a vertical direction and having a connection portion swingably connected to the center portion of the horizontal plane member of the playing box;

a plurality of elevating cylinders for moving the playing box up and down, each elevating cylinder having a main body and a piston rod, a free end of the piston rod being swingably connected to the end portion of the horizontal plane member of the playing box; and a cylinder support mechanism including:

a first support member having a first pivotal axis perpendicularly intersecting an axis of the elevating cylinder, the first support member supporting the elevating cylinder in such a manner that the elevating cylinder is swingable about the first pivotal axis; and a second support member having a second pivotal axis perpendicularly intersecting the first pivotal axis of the first support member and the axis of the elevating cylinder in such a manner that the first support member is swingable about the second pivotal axis.

10. A simulative game machine comprising: a playing box;

a supporting frame slidable in a vertical direction and swingably connected to the playing box;

a plurality of elevating cylinders for moving the playing box up and down, each elevating cylinder having a main body and a piston rod, the piston rod being swingably connected to the playing box; and a cylinder support mechanism including:

a first support member having a first pivotal axis perpendicularly intersecting an axis of the elevating cylinder, the first support member supporting the elevating cylinder in such a manner that the elevating cylinder is swingable about the first pivotal axis; and a second support member having a second pivotal axis perpendicularly intersecting the first pivotal axis of the first support member and the axis of the elevating cylinder in such a manner that the first support member is swingable about the second pivotal axis.

* * * * *